(12) United States Patent
Omori et al.

(10) Patent No.: US 7,493,631 B2
(45) Date of Patent: Feb. 17, 2009

(54) DISC DRIVE APPARATUS

(75) Inventors: Kiyoshi Omori, Tokyo (JP); Hidekazu Seto, Tokyo (JP); Takashi Aoyama, Tokyo (JP); Hitoshi Taniguchi, Kanagawa (JP)

(73) Assignee: Sony Corporation (JP)

( * ) Notice: Subject to any disclaimer, the term of this patent is extended or adjusted under 35 U.S.C. 154(b) by 552 days.

(21) Appl. No.: 10/890,291

(22) Filed: Jul. 14, 2004

(65) Prior Publication Data

US 2005/0055706 A1 Mar. 10, 2005

(30) Foreign Application Priority Data

Jul. 31, 2003 (JP) ............................. P2003-284228

(51) Int. Cl.
G11B 17/03 (2006.01)

(52) U.S. Cl. ..................................................... 720/700

(58) Field of Classification Search ....................... None
See application file for complete search history.

(56) References Cited

U.S. PATENT DOCUMENTS

| | | | | |
|---|---|---|---|---|
| 5,796,707 | A * | 8/1998 | Kim ............................ | 720/697 |
| 6,014,362 | A * | 1/2000 | Park ............................ | 720/697 |
| 6,772,427 | B2 * | 8/2004 | Shishido et al. ............. | 720/663 |
| 6,792,614 | B1 * | 9/2004 | Matsumura et al. ......... | 720/700 |
| 7,028,319 | B2 * | 4/2006 | Wang ........................ | 720/700 |

FOREIGN PATENT DOCUMENTS

| | | |
|---|---|---|
| JP | 62-002924 | 1/1987 |
| JP | 62-006852 | 1/1987 |
| JP | 05-015142 | 1/1993 |
| JP | 08-017135 | 1/1996 |
| JP | 10-108405 | 4/1998 |
| JP | 11-000935 | 1/1999 |
| JP | 2000-187907 | 7/2000 |
| JP | 2001-052345 | 2/2001 |
| JP | 2001-101777 | 4/2001 |
| JP | 2001-101778 | 4/2001 |
| JP | 2001-245451 | 9/2001 |
| JP | 2001-307340 | 11/2001 |
| JP | 2002-109819 | 4/2002 |
| JP | 2002-171709 | 6/2002 |
| JP | 2003-233944 | 8/2003 |

OTHER PUBLICATIONS

Notification of Reasons for Refusal, Application No. 2003-284228, Drafting date: Jun. 29, 2006.

* cited by examiner

*Primary Examiner*—David D Davis
(74) *Attorney, Agent, or Firm*—Rader Fishman & Grauer PLLC; Ronald P. Kananen

(57) ABSTRACT

The present invention relates to a disc drive apparatus capable of preventing skew or wobble from occurring when a spindle motor is attached to a base.

The disc drive apparatus according to the present invention comprises: a turntable 22 which holds an optical disc 2; a spindle motor which rotatively drives the turntable 22; an optical pick-up 20 which writes/reads signals on or from the optical disc 2; guide shafts 42a and 42b which slidably supports the optical pick-up 20 in the radial direction of the optical disc 2, and a base 15 to which a spindle motor 23 and both end portions of each of the guide shafts 42a and 42b, wherein the spindle motor 23 is attached to the base 15 through a spacer member 28 which performs positioning of the turntable 22 in the vertical direction thereof relative to the base 15.

8 Claims, 11 Drawing Sheets

DISC DRIVE APPARATUS

BACKGROUND OF THE INVENTION

1. Field of the Invention

The present invention relates to a disc drive apparatus which records/reproduces information signals on or from an optical disc such as an optical disc or a magneto-optical disc.

2. Description of the Related Art

As an optical disc, an optical disc such as a CD (Compact Disc) and a DVD (Digital Versatile Disc), a magneto-optical disc such as an MD (Mini Disc), and the like are widely known, and various disc drive apparatuses have accordingly been launched on the market.

As shown in, for example, FIG. 13, a disc drive unit 200 included in the disc drive apparatus which records/reproduces information signals on or from an optical disc comprises: a disc rotation drive mechanism 201 which rotatively drives the optical disc; an optical pick-up 202 which performs writing/reading operation of signals on or from the optical disc rotatively driven by the disc rotation drive mechanism 201; and a pick-up feeding mechanism 203 which feeds the optical pick-up 202 in the radial direction of the optical disc. Each of the above components is attached to a base 204 to constitute the disc drive unit 200.

The disc rotation drive mechanism 201 has a flat-shaped spindle motor 206 on which a turntable 205 for holding the optical disc is provided. The spindle motor 206 rotatively drives the optical disc and turntable 205 as a unit.

The optical pick-up 202 allows an objective lens 207 to focus a light beam emitted from a semiconductor laser onto a signal recording surface of the optical disc, and detects a return light beam reflected from the signal recording surface of the optical disc by means of a photodetector, thereby performing writing/reading operation on or from the optical disc.

The pick-up feeding mechanism 203 has: a pair of guide shafts 208a and 208b which movably support the optical pick-up 202 in the radial direction of the optical disc; a rack member 209 attached to the optical pick-up 202; a lead screw 210 engaged with the rack member 209; and an stepping motor 211 which rotatively drives the lead screw 210. The stepping motor 211 rotatively drives the lead screw 210 to drive/displace the rack member 209 engaged with the lead screw 210 and the optical pick-up 202 as a unit in the radial direction of the optical disc.

An opening portion for turntable 212a and an opening portion for optical pick-up 212b are continuously formed inside the base 204 so as to allow the turntable 205 and the optical pick-up 202 to face upward, respectively. The spindle motor 206, both end portions of each of the pair of guide shafts 208a and 208b, lead screw 210, stepping motor 211 and the like are attached to one main surface on the side opposite to the other main surface on which the opening portions 212a and 212b are formed to allow the turntable 205 and the optical pick-up 202 to face upward, respectively.

In the disc drive unit 200 having the above configuration, the disc rotation drive mechanism 201 rotatively drives the optical disc and the pick-up feeding mechanism 203 feeds the optical pick-up 202 in the radial direction of the optical disc. In parallel with the above operations, the optical pick-up 202 performs writing/reading operation of signals with respect to the optical disc, thereby recording/reproducing information signals on or from a desired recording track of the optical disc.

In the above disc drive unit 200, several approaches are made in order to meet the growth of a recording density of the optical disc. For example, wavelength of the light beam emitted from the optical pick-up 202 and irradiated on the optical disc is shortened, or numerical aperture of the objective lens 207 is increased. However, this generates tilt (hereinafter referred to as "skew") of an optical axis of the light beam emitted from the optical pick-up 202 with respect to a signal recording surface of the optical disc to increase frequency in occurrence of aberration, thereby leading to significant deterioration in recording/reproduction characteristics. That is, in the disc drive unit 200, the more responses to the growth of a recording density are made, the smaller a tolerance of skew becomes. Therefore, it is necessary that the light beam emitted from the optical pick-up 202 strike a signal recording surface of the optical disc held by the turntable 205 at right angles in order to obtain satisfactory recording/reproducing characteristics with respect to the optical disc.

To adjust skew of the optical pick-up 202 relative to the optical disc, two methods are available; one is a method of adjusting attachment angle of the spindle motor 206 relative to the base 204, and the other is a method of adjusting skew of the pair of the guide shafts 208a and 208b supporting the optical pick-up 202 (refer to, for example, Jpn. Pat. Appln. Laid-Open Publication No. 2002-171709).

When the disc drive apparatus is mounted in a portable electronic device such as a notebook personal computer as an ultraslim disc drive apparatus, it will be subjected to various restraints in the aforementioned skew adjustment of the optical pick-up 202 relative to the optical disc.

For example, in the ultraslim disc drive apparatus, a clearance in the vertical direction of the optical disc held by the turntable 205 is very small. Therefore, in the aforementioned method of adjusting attachment angle of the spindle motor 206 relative to the base 204, the outer peripheral side of the optical disc held by the turntable 205 greatly tilts. This increases the risk of a crash between the optical disc and the optical pick-up 202 at the outer peripheral side of the optical disc when an external impact is applied to the disc drive unit 200. Especially, a reduction in the thickness of the entire apparatus to 9.5 mm, which corresponds to the thickness of a hard disc drive (HDD) unit not only increases the risk of a crash between the optical disc and the optical pick-up 202, but also greatly narrows the range for skew adjustment. Further, in a method of adjusting skew of both the spindle motor 206 and the pair of the guide shafts 208a and 208b, increased adjustment points complicate an adjustment work or positioning calculation, which makes it difficult to obtain accuracy.

Therefore, in a type that requires a reduction in size, weight, and thickness, e.g., a type in which the disc drive unit 200 is directly attached to a disc tray, the following method is desirable. That is, in a state where the spindle motor 206 is fixed to the base 204 and parallelism between the base 204 and turntable 205 which holds the optical disc is maintained, positions that support each end portions of the pair of guide shafts 208a and 208b are adjusted so that the light beam emitted from the optical pick-up 202 strikes a signal recording surface of the optical disc at right angles to thereby adjust the distance between the optical pick-up 202 and a signal recording surface of the optical disc, and skew of the optical pick-up 202 relative to a signal recording surface of the optical disc.

From the viewpoint of the aforementioned case, when the spindle motor 206 is attached to the base 204, parallelism between the turntable 205 which holds the optical disc and the base 204 must be maintained with high level of accuracy.

As shown in FIG. 14, in the above disc drive unit 200, a support plate 213 which supports the spindle motor 206 is attached to the back surface of the base 204 through three locating members 214a, 214b, and 214c.

For maintaining parallelism between the base 204 and the turntable 205, the three locating members 214a, 214b, and 214c are designed such that abutment surfaces 215a, 215b, and 215c that come in contact with the support plate 213 have the same height dimension D'. A boss 216 for locating the support plate 213 in the in-plane direction is formed at a central potion of each of the abutment surfaces 215a, 215b, and 215c so as to project from the abutment surfaces. Each of the bosses 216 has a screw hole 217 formed at a central portion thereof to screw on the support plate 213. On the other hand, three boss holes 218 corresponding to the locating members 214a, 214b, and 214c are formed on the support plate 213. That is, with the bosses 216 of the locating members 214a, 214b, and 214c engaged respectively with the boss holes 218 of the support plate 213, the support plate 213 supporting the spindle motor 206 is fixed to the base 204 through the locating members 214a, 214b, and 214c by inserting screws 219 respectively into the screw holes 218 of the bosses 216 that face the boss holes 218 respectively.

In the conventional configuration in which the spindle motor 206 supported by the support plate 213 is fixed to the base 204 through the three locating members 214a, 214b, and 214c, even when the three locating members 214a, 214b, and 214c are designed such that abutment surfaces 215a, 215b, and 215c that come in contact with the support plate 213 have the same height dimension D', as shown in FIG. 15, a dimension deviation of up to 2d' occurs depending on the difference between the dimensional tolerances ±d' of each of the locating members 214a, 214b, and 214c.

As a result, in the above conventional attachment configuration of the spindle motor 206, skew, wobble or the like is caused between the turntable 205 and the base 204 due to the difference between the dimensional tolerances ±d' of each of the locating members 214a, 214b, and 214c, which makes it very difficult to maintain parallelism between the base 204 and the optical disc held by the turntable 205. Further, to prevent the skew from occurring when the spindle motor 206 is fixed to the base 204, it is necessary to increase dimensional accuracy in the vertical direction of each of the locating members 214a, 214b, and 214c. This results in an increase in the number of parts required, leading to an increase in manufacturing cost.

SUMMARY OF THE INVENTION

The present invention has been made in view of the above situation, and an object thereof is to provide a disc drive apparatus capable of preventing skew or wobble from occurring when the spindle motor is fixed to the base, and maintaining parallelism between the turntable which holds the optical disc and the base with high level of accuracy without involving an increase in manufacturing cost, and a disc drive unit which is mounted in the disc drive apparatus.

To achieve the above object, according to one aspect of the present invention, there is provided a disc drive apparatus comprising: a casing; and a disc drive unit contained in the casing, wherein the disc drive unit includes: a rotation drive mechanism which has a turntable for holding an optical disc and a spindle motor for rotatively driving the turntable, the spindle motor rotatively driving the optical disc and turntable as a unit; an optical pick-up which radiates a light beam to a signal recording surface of the optical disc rotatively driven by the rotation drive mechanism to write/read signals on or from the optical disc; a guide mechanism which has a guide shaft for slidably supporting the optical pick-up to allow the same to move in the radial direction of the optical disc and guides the optical pick-up between the inner circumference and outer circumference of the optical disc; and a base which has an opening through which the turntable faces upward and another opening through which the optical pick-up faces upward, a main surface on the side of which the turntable and optical pick-up face upward through the openings, and another main surface on the side opposite to the main surface to which the spindle motor and both end portions of the guide shaft are attached, and wherein the spindle motor is attached to the base through a spacer member which performs positioning of the turntable in the vertical direction thereof with respect to the base.

According to another aspect of the present invention, there is provided a disc drive unit comprising: a rotation drive mechanism which has a turntable for holding an optical disc and a spindle motor for rotatively driving the turntable, the spindle motor rotatively driving the optical disc and turntable as a unit; an optical pick-up which radiates a light beam to a signal recording surface of the optical disc rotatively driven by the rotation drive mechanism to write/read signals on or from the optical disc; a guide mechanism which has a guide shaft for slidably supporting the optical pick-up to allow the same to move in the radial direction of the optical disc and guides the optical pick-up between the inner circumference and outer circumference of the optical disc; and a base which has an opening through which the turntable faces upward and another opening through which the optical pick-up faces upward, a main surface on the side of which the turntable and optical pick-up face upward through the openings, and another main surface on the side opposite to the main surface to which the spindle motor and both end portions of the guide shaft are attached, wherein the spindle motor is attached to the base through a spacer member which performs positioning of the turntable in the vertical direction thereof with respect to the base.

As described above, according to the present invention, the spindle motor is attached to the base through the spacer member which performs positioning of the turntable in the vertical direction relative to the base. As a result, the spindle motor is attached to the base with high accuracy without being influenced by dimensional tolerance of the spacer member.

Further, according to the present invention, the attachment accuracy of the spindle motor to the base is increased, thereby maintaining parallelism between the turntable and the base. Therefore, the present invention can meet the growth of a recording density of the optical disc and a reduction in size, weight or thickness of the entire device.

DETAILED DESCRIPTION OF THE PREFERRED EMBODIMENTS

A disc drive apparatus and disc drive unit to which the present invention is applied will be described below in detail with reference to the accompanying drawings.

Figure 1:
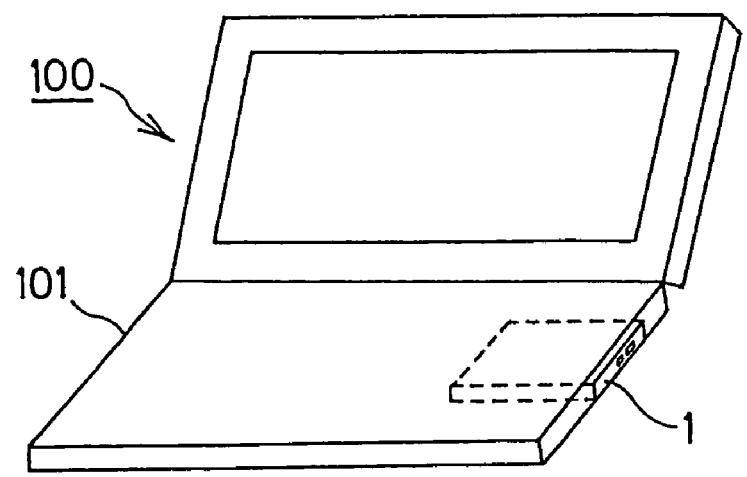
FIG. 1 is a perspective view showing a notebook personal computer in which the disc drive apparatus to which the present invention is applied is mounted.

As shown in FIG. 1, a disc drive apparatus 1 to which the present invention is applied is an ultraslim disc drive apparatus mounted in a device main body 101 of e.g., a notebook personal computer 100. The disc drive apparatus 1 has a configuration in which the thickness of the entire unit is reduced to, e.g., about 9.5 mm, which corresponds to the thickness of a hard disc drive (HDD) unit, as shown in FIGS. 2 and 3, and is capable of recording/reproducing information signals on or from an optical disc 2 such as a CD (Compact Disc) or a DVD (Digital Versatile Disc).

Figure 2:
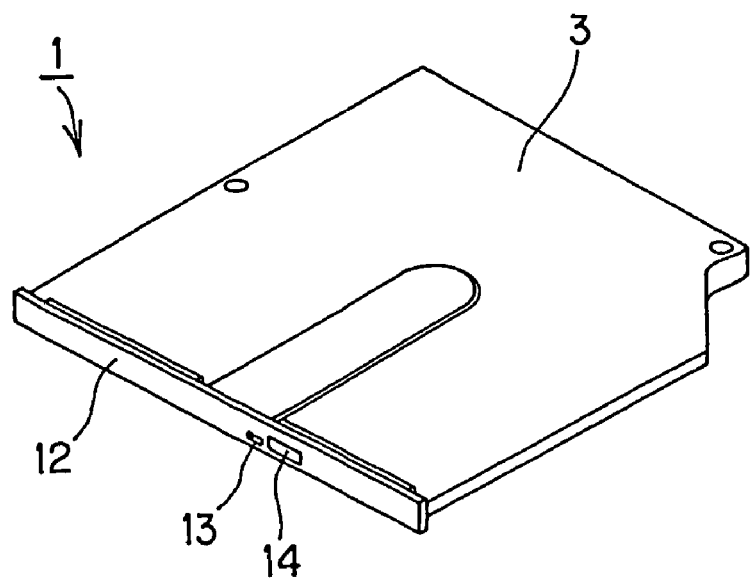
FIG. 2 is a perspective view showing a state where a disc tray of the disc drive apparatus has been retracted.
Figure 3:
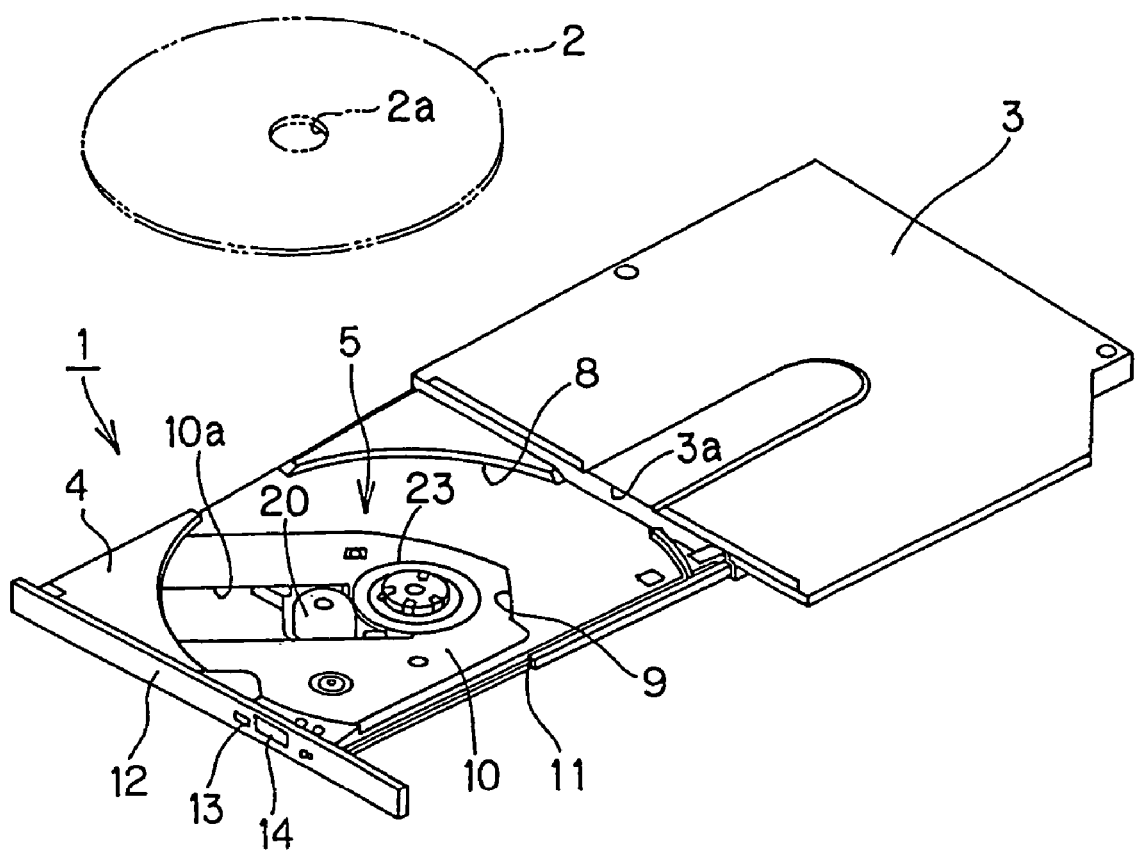
FIG. 3 is a perspective view showing a state where a disc tray of the disc drive apparatus is pulled out.
Figure 4:
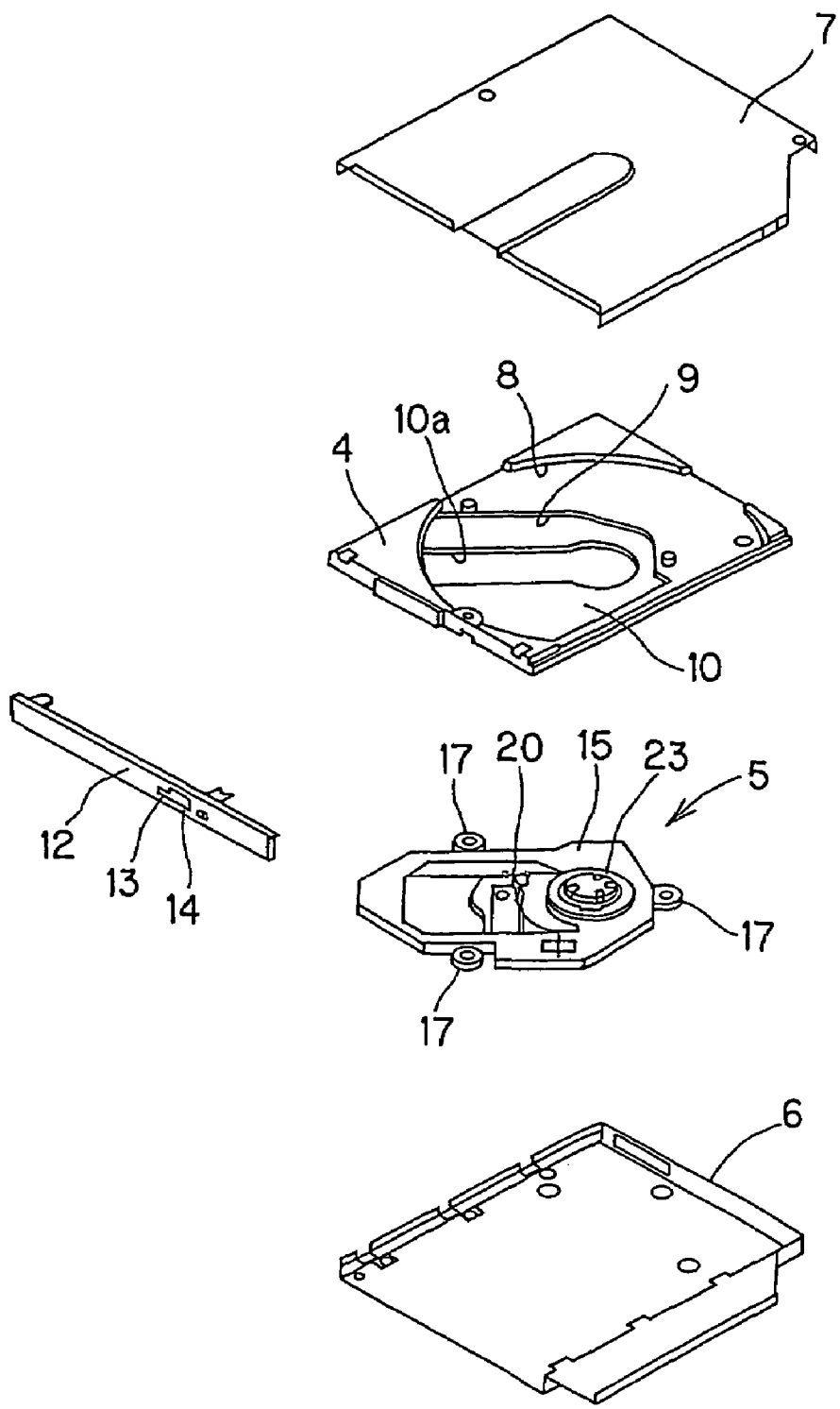
FIG. 4 is an exploded perspective view showing the configuration of the disc drive apparatus.

More specifically, as shown in FIGS. 2, 3, and 4, the disc drive apparatus 1 comprises a casing 3 which serves as an outer case of the drive main body, a disc tray 4 which is horizontally moved in and out of a tray opening 3a disposed at the front surface of the casing 3, and a disc drive unit 5 fixed to the disc tray 4.

The casing 3 is formed by threadably fixing a cover body 7, which is made of a metal plate, to a bottom chassis 6, which is made of a metal plate having a flat box-like shape so that the cover body 7 covers the bottom chassis 6. The casing 3 has an opening which serves as the tray opening 3a at the front surface thereof, and a housing space for housing a disc tray 4 inside thereof. On the bottom chassis 6, a circuit board (not shown) and the like are disposed, the circuit board having a drive control circuit which drives and controls each component of the disc drive unit 5, connectors for electrical connection to the device main body 101 of the notebook personal computer 100 or the like attached thereto.

The disc tray 4 is made of a resin molding material having a flat rectangular shape and has a concave portion 8 having a shape corresponding to a shape of the optical disc 2 on the upper surface portion thereof. On the bottom surface of the concave portion 8, an opening portion 9 is formed to allow the disc drive unit 5 attached to the under surface of the disc tray 4 to face upward. To the disc drive unit 5 that faces upward through the opening portion 9, a dressing board 10 is attached to cover the opening portion 9, as shown in FIG. 3. On the dressing board 10, an opening portion 10a, which corresponds to opening portions 18a and 18b allowing a spindle motor 23 and an optical pick-up 20 of the disc drive unit 5 (to be described later) to face upward, is formed.

The disc tray 4 is supported by a guide rail mechanism 11 interposed between the both side surfaces thereof and inside surface of the bottom chassis 6 so as to be slidable between "pull-out position", the state of which is shown in FIG. 3, at which the disc tray 4 has been completely pulled out of the casing 3 through the tray opening 3a and "housing position", the state of which is shown in FIG. 2, at which the tray 4 has been completely retracted into the inside of casing 3 through the tray opening 3a. Attached to the front surface of the disc tray 4 is a front panel 12 having a substantially rectangular flat plate shape and serving as a cover for opening/closing the tray opening 3a of the casing 3. Formed on the surface of the front panel 12 is a display portion 13 for displaying, by light flashing, a state where the optical disc 2 is accessed, and an eject button 14 to be depressed when the disc tray 4 needs to be ejected.

A slide movement of the disc tray 4 in the front surface side direction thereof is locked by a lock mechanism (not shown) in the housing position. Upon depression of the eject button 14 in this state, the locked state by the lock mechanism is released, so that the disc tray 4 is pushed out to the front surface side through the tray opening 3a. As a result, it is possible to pull out the disc tray 4 to "pull-out position" through the tray opening 3a. When the disc tray 4 is pushed into "housing position" of the casing 3, the slide movement in the front surface side direction is locked again by the lock mechanism.

Figure 5:
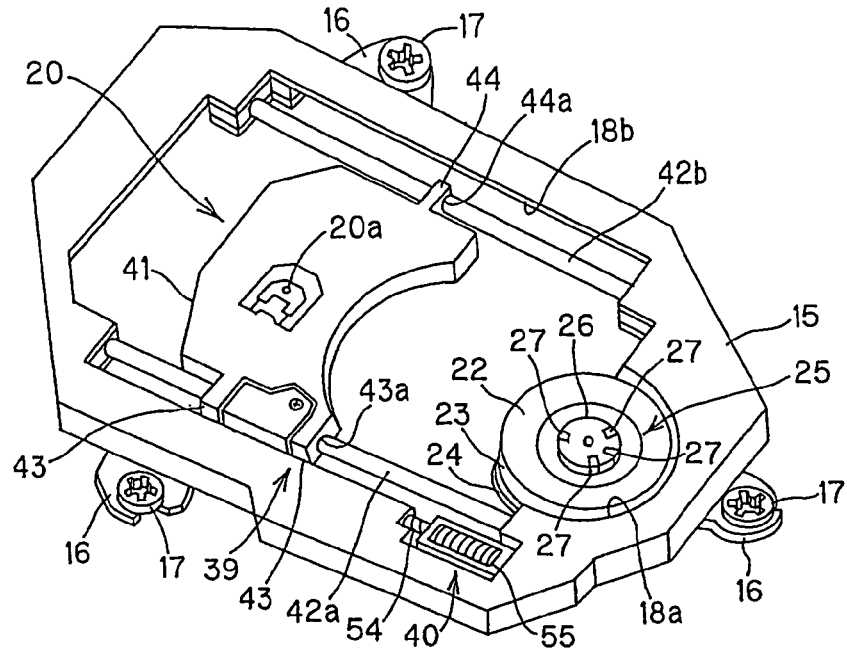
FIG. 5 is a perspective view of the disc drive unit as viewed from the upper surface side thereof.

As shown in FIGS. 4 and 5, the disc drive unit 5 comprises a sub-chassis 15 serving as a base member. The sub-chassis 15 is formed by punching out a metal plate in a predetermined shape, and slightly bending a peripheral portion of the resultant metal plate downward. Three insulator attachment portions 16 are bent-formed to project outward from the bent down edge portion of the sub-chassis 15. Attached to each of the insulator attachment portions 16 is an insulator 17 made of an elastic member such as a rubber for absorbing vibration or the like. The sub-chassis 15 is supported by spindles formed on the under surface of the disc tray 4 through the insulators 17. Integrally formed on the main surface of the sub-chassis 15 are a substantially semicircular opening for turntable 18a for allowing a turntable 22 (to be described later) to face upward and a substantially rectangular opening for pick-up 18b for allowing the optical pick-up 20 (to be described later) to face upward.

The disc drive unit 5 has an ultraslim structure and includes a disc rotation drive mechanism 19 which rotatively drives the optical disc 2, an optical pick-up 20 which writes/reads signals on or from the optical disc 2 rotatively driven by the disc rotation drive mechanism 19, and a pick-up feeding mechanism 21 which feeds the optical pick-up 20 in the radial direction of the optical disc 2. These components are attached to the under surface of the sub-chassis 15.

The disc rotation drive mechanism 19 has a flat-shaped spindle motor 23 on the upper surface of which a turntable 22 for holding the optical disc 2 is formed. The spindle motor 23 is supported by a support plate 24. More specifically, the spindle motor 23 has: a stator having a printed circuit board bonded to the support plate 24, a thin-film coil being patterned on the printed circuit board; and a rotor to the inside of which is attached a magnet disposed opposite to the stator and the upper surface of which the turntable 22 is placed. In this configuration, an electromagnetic force between magnetic field generated by a current flowing through the thin-film coil and the magnet rotatively drives the rotor. A drive control circuit for rotatively driving the spindle motor 23 is included in a circuit board of the bottom chassis 6, so that a significant reduction in the size of the support plate 24 has been achieved as compared to the case of the aforementioned support plate 213 shown in FIG. 14.

Provided at the central portion of the turntable 22 is a chucking mechanism 25 for holding the optical disc 2. The chucking mechanism 25 has a centering portion 26 to be engaged with a center hole 2a of the optical disc 2, and a plurality of engagement pawls 27 which lock the circumference of the center hole 2a of the optical disc 2 engaged with the centering portion 26. The chucking mechanism 25 holds the optical disc 2 on the turntable 22 while performing centering of the optical disc 2 attached to the turntable 22. In the above configuration, the spindle motor 23 rotatively drives the optical disc 2 and the turntable 22 as a unit at a constant linear velocity or a constant angular velocity, in the disc rotation drive mechanism 19.

Figure 6:
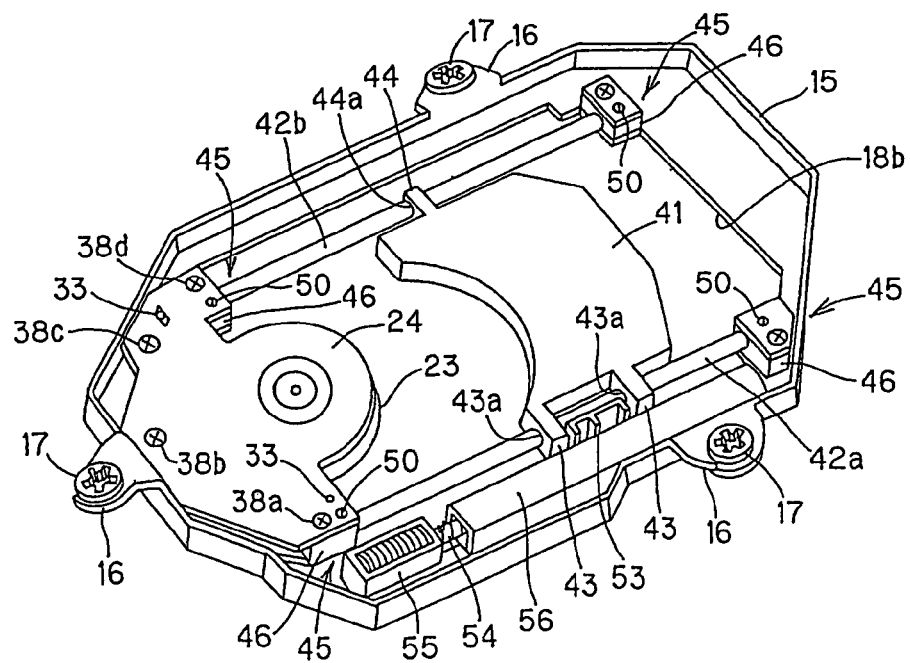
FIG. 6 is a perspective view of the disc drive unit as viewed from the under surface side thereof.
Figures 7, 8:
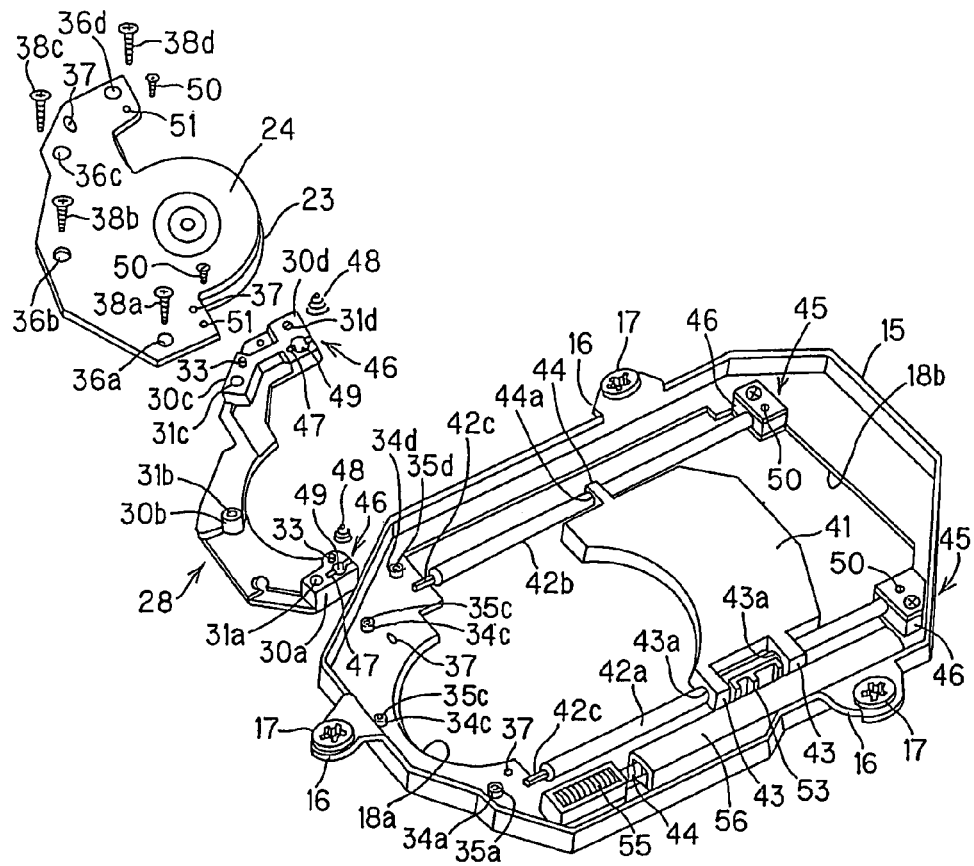
FIG. 7 is an exploded perspective view of the disc drive unit as viewed from the under surface side thereof.
FIG. 8 is a perspective view showing the configuration of the spacer member.

As shown in FIGS. 6 and 7, in the disc rotation drive mechanism 19, the support plate 24 for supporting the spindle motor 23 is threadably attached to the under surface of the sub-chassis 15 through a spacer member 28 so that the turntable 22 slightly projects, through the opening for turntable 18a of the sub-chassis 15, from the upper surface of the sub-chassis 15.

Figure 9:
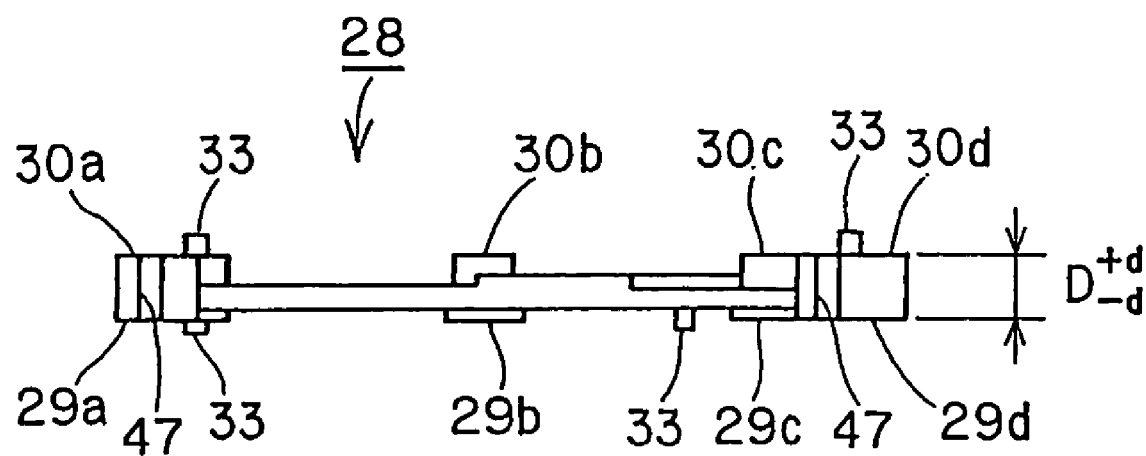
FIG. 9 is a side view showing the configuration of the spacer member.

As the spacer member 28, as shown in FIGS. 7, 8, and 9, a member that is formed with high accuracy with a predetermined thickness D, which is obtained by injection molding a resin molding material using a mold, is employed in order to perform positioning of the turntable 22 in the vertical direction thereof relative to the above sub-chassis 15 with high accuracy and to maintain parallelism between the sub-chassis 15 and the turntable 22 with high accuracy. Note that it is preferable to use a liquid crystal polymer having a low thermal shrinkage and a high rigidity as the resin molding material.

The spacer member 28 interposed between the sub-chassis 15 and the support plate 24 has a shape corresponding to a shape of the circumference of the opening for turntable 18a and a shape of the inner periphery of the opening for pick-up 18b. Formed in a protruding condition on the main surface of the spacer member 28 that faces the sub-chassis 15 are four first reference projections 29a, 29b, 29c, and 29d, through which the spacer member 28 is brought into contact with the sub-chassis 15 with a constant space. On the other hand, formed in a protruding manner on the other main surface of the spacer member 28 that faces the support plate 24 are four second reference projections 30a, 30b, 30c, and 30d. The second reference projections 30a to 30d are disposed in the positions corresponding respectively to the positions of the first reference projections 29a to 29d. The spacer member 28 is brought into contact with the support member 24 through the second reference projections 29a to 29d with a constant space. Note that the second reference projections 30c and 30d, which are adjacently disposed, are formed as the consecutive contacting surface.

When injection molding is performed using a mold to obtain the spacer member 28, one main surface that faces the sub-chassis 15 is shaped by one mold, and the other main surface that faces the support plate 24 is shaped by another mold. As a result, in the spacer member 28, it is possible to significantly increase dimensional accuracy in the vertical direction of each of the four first reference projections 29a to 29d formed in a protruding manner with the same height on one main surface, and each of the four second reference projections 30a to 30d formed in a protruding manner with the same height on the other main surface.

Further, four through holes 31a, 31b, 31c, and 31d are drilled across the spacer member 28. Each of the four through holes 31a to 31d pierces the corresponding one of first reference projections 29a to 29d and corresponding one of the second reference projections 30a to 30d respectively in the thickness direction of the spacer member 28. Cylindrical step portions 32a, 32b, 32c, and 32d are formed on each contacting surface of the first reference projections 29a to 29d, such that each vertical position of the cylindrical step portions is one step lower than the contacting surfaces, to surround each of the through holes 31a to 31d.

Formed in a protruding manner on the both main surfaces of the spacer member 28 are a plurality of bosses 33 for positioning in the in-plane direction the spacer member 28 and rotation lock when being screwed. It is preferable that at least two bosses be formed on the both main surfaces of the spacer member 28.

Here, two bosses are formed on the both main surfaces of the spacer member 28. On the other hand, four screw holes 34a, 34b, 34c, and 34d, each of which corresponds to the through holes 31a to 31d of the spacer member 28 respectively, are drilled across the sub-chassis 15. The four screw holes 34a to 34d are respectively formed inside of cylindrical portions 35a, 35b, 35c, and 35d, which project from the under surface of the sub-chassis 15. Further, four hole portions 36a, 36b, 36c, and 36d, each of which corresponds to the through holes 31a to 31d of the spacer member 28 respectively, are drilled across the support plate 24. Further, drilled across the sub-chassis 15 and the support plate 24 are boss holes 37 corresponding to bosses 33 formed on the both surfaces of the spacer member 28.

Figure 10:
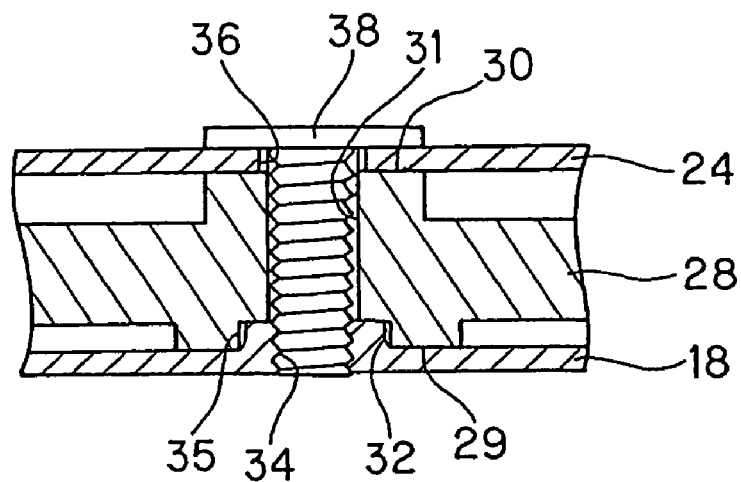
FIG. 10 is a cross sectional view showing a main portion of the attachment configuration of the support plate, spacer member and sub-chassis.
Figure 11:
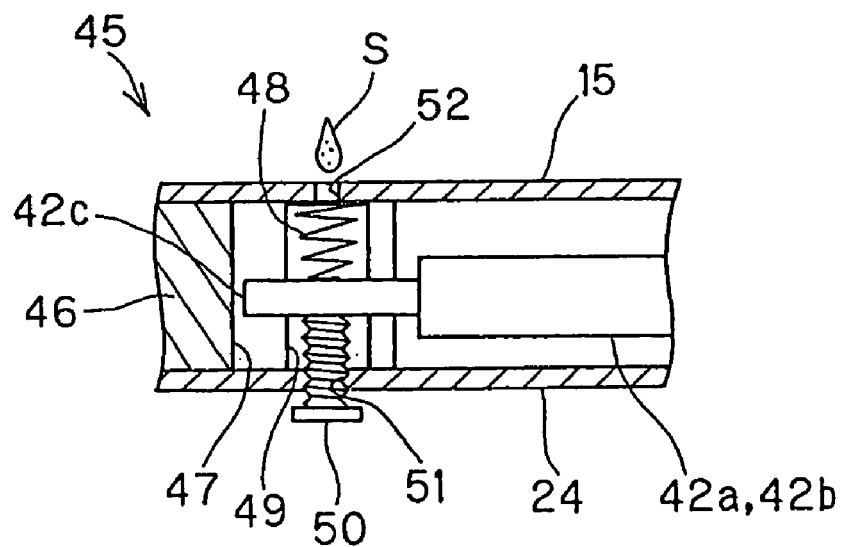
FIG. 11 is a cross sectional view showing the configuration of a skew adjustment mechanism.
Figure 12:
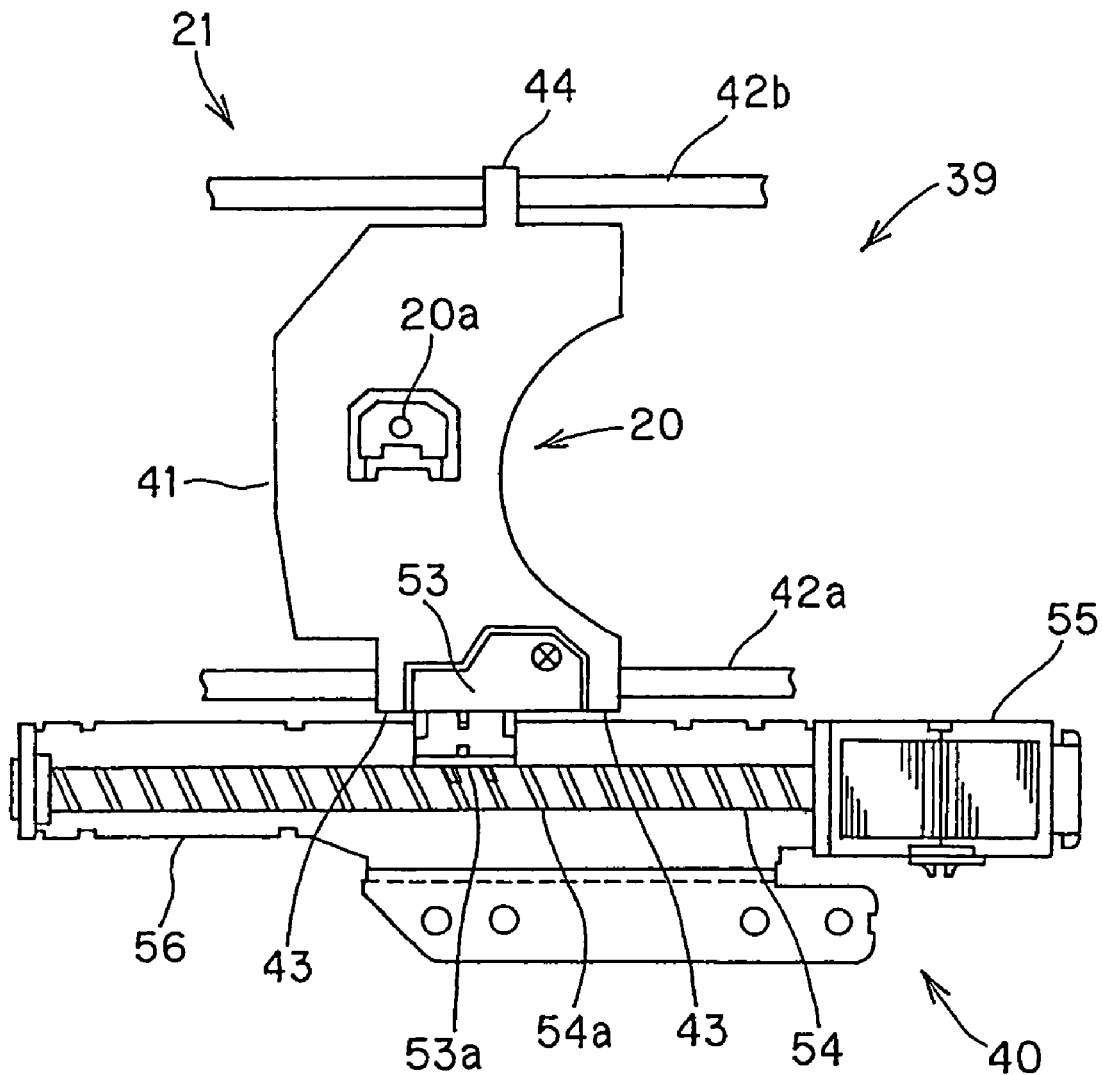
FIG. 12 is a plan view showing the configuration of a pick-up feeding mechanism.
Figure 13:
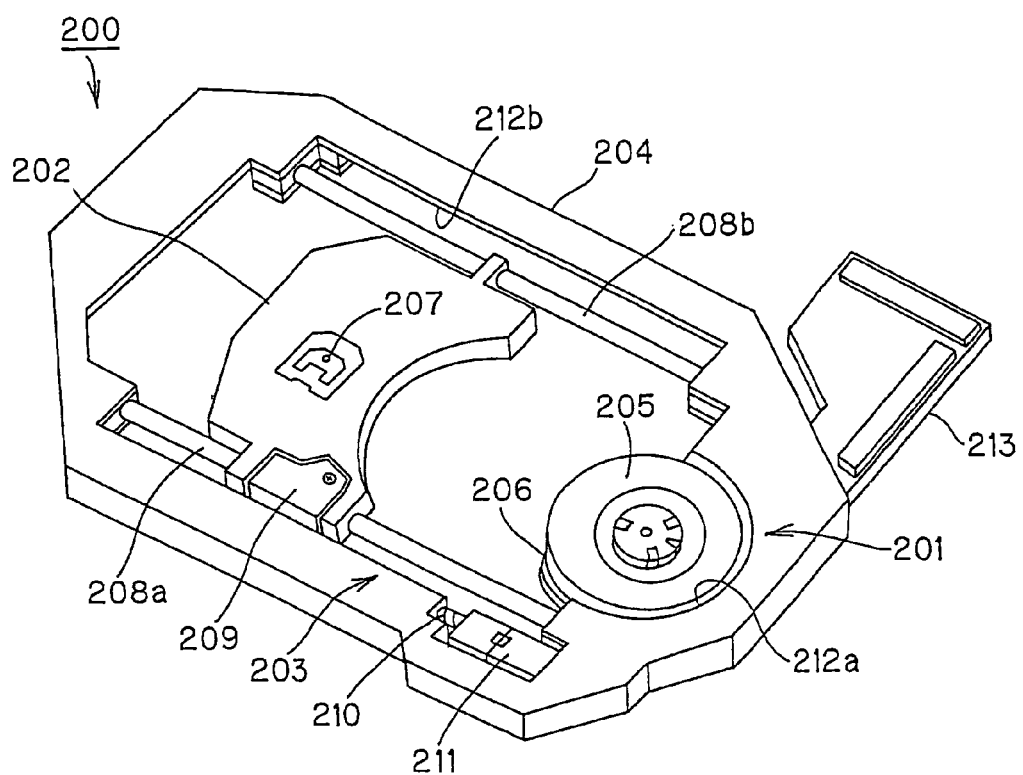
FIG. 13 is a perspective view showing the configuration of a conventional disc drive apparatus.

When the spindle motor 23 supported by the support plate 24 is attached to the under surface of the sub-chassis 15 through the spacer member 28, firstly each boss 33 of the spacer member 28 is engaged with each boss hole 37 of both the support plate 24 and sub-chassis 15, and each cylindrical portion 35 of the sub-chassis 15 is engaged with each step portion 32 of the spacer member 28, so that the spacer member 28 is sandwiched between the support plate 24 and the sub-chassis 15, as shown in FIG. 10. In this stacked state, each holes portion 36 of the support plate 24, each through hole 31 of the spacer member 28, and each screw hole 34 of the sub-chassis 15 align with each other. Next, in this circumstance, an attachment screw 38 is inserted into each screw hole 34 of the sub-chassis 15, through each hole portion 36 of the support plate 24 and each through hole 31 of the spacer member 28. In this manner, the spindle motor 23 is fixed to the under surface of the sub-chassis 15 through the spacer member 28 so as to be supported by the sub-chassis 15 in a state where the turn table 22 projects upward from the opening for turntable 18a of the sub-chassis 15.

As shown in FIG. 5, the optical pick-up 20 has an optical block in which a light beam emitted from a semiconductor laser serving as a light source is condensed by an objective lens 20a, a signal recording surface of the optical disc 2 is irradiated with the resultant light beam, and a return light beam reflected from the signal recording surface of the optical disc 2 is detected by means of a photodetector including a light-sensitive element and the like, thereby realizing writing/reproducing operation of signals on or from the optical disc 2. The optical pick-up 20 also has a biaxial actuator which drives/displaces the objective lens 20a in a focusing direction parallel to the optical axis of the objective lens 20a or in a tracking direction perpendicular to the optical axis of the objective lens 20a. With the biaxial actuator, the optical pick-up 20 performs focusing control and tracking control of the objective lens 20a with respect to the optical disc 2 based on detection signals detected from the optical disc 2 through the photodetector.

The pick-up feeding mechanism 21 has a guide mechanism 39 which slidably supports the optical pick-up 20 in the radial direction of the optical disc 2, and a displacement drive mechanism 40 which drives/displaces the optical pick-up 20 supported by the guide mechanism 39 in the radial direction of the optical disc 2, as shown in FIGS. 5 and 6.

The guide mechanism 39 has a pick-up base 41 incorporating the optical pick-up 20, and a pair of guide shafts 42a and 42b which slidably supports the pick-up base 41 in the radial direction of the optical disc 2.

The pick-up base 41 has a pair of guide projections 43 across each of which a guide hole 43a is drilled for insertion of the guide shaft 42a, and guide projection 44 across which a guide groove 44a is drilled for insertion of the guide shaft 42b. The pair of guide projection 43 and guide projection 44 protrude in opposed directions with respect to each other. Thus, the pick-up base 41 can slide along the pair of guide shafts 42a and 42b.

The pair of guide shafts 42a and 42b are disposed in the under surface of the sub-chassis 15 so as to be parallel to the radial direction of the optical disc 2, and guide the pick-up base 41 in which the objective lens 20a faces upward through the opening for pick-up 18b of the sub-chassis 15 from the inner to outer circumference of the optical disc 2. Both end portions of each of the pair of guide shafts 42a and 42b are attached to the under surface of the sub-chassis 15 through skew adjustment mechanisms 45.

Figure 14:
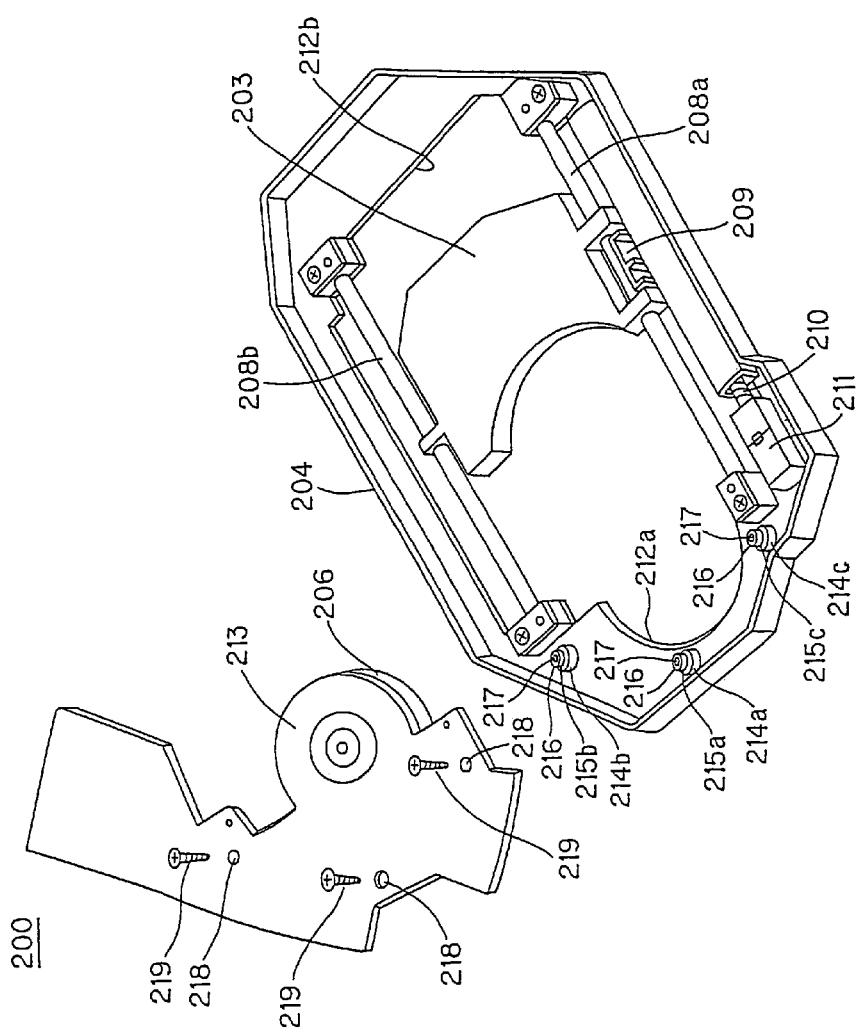
FIG. 14 is an exploded perspective view showing the configuration of the conventional disc drive apparatus.

The skew adjustment mechanisms 45 movably supports the both end portions of each of the pair of guide shafts 42a and 42b in a direction perpendicular to the main surface of the sub-chassis 15, and can individually adjust positions at which both end portions of each of the guide shafts 42a and 42b are supported. More specifically, as shown in FIGS. 10 and 14, each of the skew adjustment mechanism 45 includes a shaft supporting member 46 which supports each outer circumference side end portion of the guide shafts 42a and 42b. Further, another two shaft supporting members 46, each of which supports each inner circumference side end portion of the guide shafts 42a and 42b, are formed integrally with the spacer member 28. That is, a pair of shaft supporting portions 46 each of which supports each inner circumference side end portion of the guide shafts 42a and 42b are formed on the spacer member 28.

The shaft supporting members 46 and shaft supporting portions 46 have substantially the same configuration, and the shaft supporting portions 46 included in the spacer member 28 will be exemplified here.

The shaft supporting portion 46 has a guide slit 47 for insertion of an end portion 42c of the guide shaft 42a or 42b, and a retaining hole 49 for retaining a substantially cylindrical helical spring 48. The guide slit 47 is formed by cutting out the end portion of the shaft supporting portion 46 that faces the end portion of the guide shaft 42a or 42b in the thickness direction of the shaft supporting portion 46. On the other hand, an end portion 42c of the guide shaft 42a or 42b is cut away to have substantially a thin rectangular cross section so as to be inserted into the guide slit 47. The retaining hole 49, which is a through hole, pierces the shaft supporting portion 46 in the thickness direction thereof at the midway portion of the guide slit 47. The helical spring 48 is retained in the retaining hole 49 in a state of being compressed between the sub-chassis 15 and the end portion 42c of the guide shaft 42a or 42b. Across the support plate 24 which allows the shaft supporting portion 46 to be sandwiched between itself and the sub-chassis 15, a screw hole 51 for insertion of an adjustment screw 50 is drilled to face the retaining hole 49. The adjustment screw 50 has, on the head, a minus-shaped groove for confirmation of a screwed depth. The leading end of the adjustment screw 50 is brought into contact with the guide shaft 42a or 42b in a state of being inserted into the screw hole 51.

Therefore, in the skew adjustment mechanism 45, the compressed state of the helical spring 48 retained in the retaining hole 49 can be changed by adjusting the screwed depth of the adjustment screw 50. As a result, the end portion 42c of the guide shaft 42a or 42b is movably supported in a direction perpendicular to the sub-chassis 15. It follows that it is possible to adjust the positions at which the end portions 42c of the guide shafts 42a and 42b are supported.

Note that the sub-chassis 15 has injection holes 52 for injecting an adhesive s into the retaining holes 49. Therefore, after adjustment operation, supporting positions of the guide shafts 42a and 42b can be fixed by the adhesive s injected from the injection holes 52.

Figure 15:
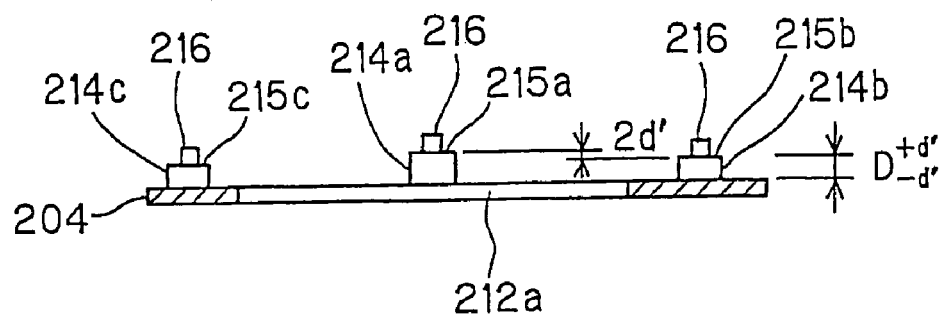
FIG. 15 is a side view for explaining the conventional attachment configuration of the spindle motor.

The displacement drive mechanism 40 has a rack member 53 attached to the pick-up base 41, a lead screw 54 to be meshed with the rack member 53, and a drive motor 55 which rotatively drives the lead screw 54, as shown in FIGS. 8, 9, and 15.

The rack member 53 has a threadably fixed base end side positioned between the pair of guide projections 43 of the pick-up base 41, and a leading end side on which a rack portion 53a to be meshed with the lead screw 54 disposed in parallel to the one guide shaft 42a formed integrally therewith. The lead screw 54 is formed integrally with a drive shaft of the drive motor 55, and has, on the outer circumference thereof, a helical leadscrew 54a to be meshed with the rack portion 53a of the rack member 53. The drive motor 55, which is so-called a stepping motor, rotatively drives the lead screw 54 in response to a drive pulse. The lead screw 54 and the drive motor 55 are supported by a bracket 56 threadbly attached to the under surface of the sub-chassis 15. The bracket 56 is a long metal plate having both end portions bent at right angles in the same direction. To the one end bent portion of the bracket 56, the drive motor 55 is fixed in a state of being pierced by the lead screw 54. The leading end of the lead screw 54 is inserted into a shaft hole drilled across the other end bent portion of the bracket 56 so as to be supported in a rotatable manner.

In the pick-up feeding mechanism 21, when the drive motor 55 rotatively drives the lead screw 54, the mesh between the lead screw 54a and rack portion 53a displaces the rack member 53 in the axial direction of the lead screw 54. As a result, the optical pick-up 20 and the pick-up base 41 are moved, as a unit, in a direction along the pair of guide shafts 42a and 42b, that is, in the radial direction of the optical disc 2.

In the disc drive apparatus 1 having the configuration as described above, the disc rotation drive mechanism 19 rotatively drives the optical disc 2 in a state where the disc tray 4 which holds the optical disc 2 has been retracted into the casing 3, and then the pick-up feeding mechanism 21 feeds the optical pick-up 20 between the inner circumference and outer circumference of the optical disc 2. In the circumstance, the optical pick-up 20 performs writing/reading operation of signals on or from the optical disc 2, thereby recording/reproducing information signals on or from a desired recording track of the optical disc 2.

In the above disc drive apparatus 1, the support plate 24 which supports the spindle motor 23 is attached to the sub-chassis 15 through the spacer member 28 which performs positioning of the turntable 22 in the vertical direction thereof relative to the sub-chassis 15.

In this case, as shown in FIG. 9, the four first reference projections 29a to 29d formed on the main surface of the spacer member 28 that faces the sub-chassis 15 are not influenced by the dimension tolerance ±d of the spacer member 28, achieving the uniformity in the height of the surface to be brought into contact with the sub-chassis 15. Similarly, the four second reference projections 30a to 30d formed on the main surface of the spacer member 28 that faces the support plate 24 are not influenced by the dimension tolerance ±d of the spacer member 28, achieving the uniformity in the height of the surface to be brought into contact with the support plate 24.

Therefore, in the disc drive apparatus 1, the spindle motor 23 can be attached, with high accuracy, to the sub-chassis 15 without being influenced by the dimension tolerance ±d of the spacer member 28. That is, in the disc drive apparatus 1, an increase in the attachment accuracy of the spindle motor 23 with respect to the sub-chassis 15 can maintain, at high levels, parallelism between a signal recording surface of the optical disc 2 held by the turntable 22 and the main surface of the sub-chassis 15. This prevents skew or wobble from occurring when the spindle motor 23 is fixed to the sub-chassis 15, allowing a light beam emitted from the optical pick-up 20 to strike, at right angles, the signal recording surface of the optical disc 2 held by the turntable 22.

Further, in the disc drive apparatus 1, when it is intended to maintain parallelism between the sub-chassis 15 and the turntable 22, it is necessary only that vertical dimension D of the spacer member 28 be managed at the time of manufacturing the mold described above. In addition, the number of the parts required in the spindle motor 23 is smaller than, and manufacturing of the spindle motor 23 is easier than in the case of the conventional attachment configuration of the spindle motor 206 shown in FIG. 15. Therefore, it is possible to maintain, with high level accuracy, parallelism between the turntable 22 and the sub-chassis 15 without involving an increase in manufacturing cost.

That is, in the aforementioned conventional attachment configuration of the spindle motor 206, the locating members 214a, 214b, and 214c are individually manufactured, so that skew or wobble of the turntable 205 relative to the base 204 is caused by the difference between the dimension tolerances ±d' of each of the locating member 214a, 214b, 214c. This makes it difficult to maintain parallelism between the sub-chassis 15 and the turntable 22. On the other hand, in the attachment configuration of the spindle motor 23 to which the present invention is applied, the spacer member 28 having locating members formed integrally therewith is used, and only the vertical dimension D of the spacer member 28 is managed. As a result, the uniformity in the vertical dimensions of the both surfaces of the spacer member 28 that face the sub-chassis 15 and the support plate 24 is achieved without being influenced by the dimension tolerance ±d of the spacer member 28. Therefore, parallelism between the sub-chassis 15 and the turntable 22 can be maintained with high accuracy.

Further, in the disc drive apparatus 1, the aforementioned skew adjustment mechanism 45 adjusts the positions at which each end portions 42c of the guide shafts 42a and 42b are supported. As a result, it is possible to adjust distance between the optical pick-up 20 slidably supported by the pair of guide shafts 42a and 42b and a signal recording surface of the optical disc 2 held by the turntable 22, and skew of the optical pick-up 20 relative to the signal recording surface of the optical disc 2.

Therefore, in the disc drive apparatus 1, skew adjustment or the like needed for the light beam emitted from the optical pick-up 20 to strike, at right angles, a signal recording surface of the optical disc 2 held by the turntable 22 can easily be performed with high accuracy.

Further, even when the disc drive apparatus 1 is mounted, as an ultraslim disc drive apparatus, in the aforementioned notebook personal computer 100, parallelism between the turntable 22 and the sub-chassis 15 is maintained with high level accuracy and the area to be adjusted by the skew adjustment mechanism 45 is small. Thus, it is possible to meet the growth of a recording density of the optical disc 2, and to meet a reduction in size, weight or thickness of the entire unit.

Further, in the disc drive apparatus 1, the shaft supporting members 46 which support the inner circumference side end portions of the pair of guide shafts 42a and 42b are formed integrally with the spacer member 28, that is, the pair of shaft supporting portions 46 supporting the inner circumference side end portions of the pair of guide shafts 42a and 42b are formed on the spacer member 28, allowing a reduction in the number of the required parts and allowing easy assembly as compared to the conventional case, which leads to further reduction in manufacturing cost.

In the disc drive apparatus 1, four points are set for fixing the support plate 24 supporting the spindle motor 23 to the under surface of the sub-chassis 15 through the spacer member 28. However, by setting at least three points for fixing, the spindle motor 23 can appropriately be attached to the sub-chassis 15. Even if the number of the fixing points is increased, it is possible to prevent skew or wobble from occurring when the spindle motor 23 is attached to the sub-chassis 15 without being influenced by the dimension tolerance d in the thickness direction of the spacer member 28. Note that arrangement of the fixing points can be arbitrarily set.

Further, in the disc drive apparatus 1, the screw holes 34 are formed in the sub-chassis 15, and hole portions 36 are formed in the support plate 24, in correspondence with the fixing points. However, contrary to the above, the configuration in which the hole portions 36 are formed in the sub-chassis 15, screw holes 34 are formed in the support plate 24, and an attachment screw 38 is inserted from the sub-chassis 15 side may be employed.

The present invention is not limited to the disc drive apparatus 1 that records/reproduces information signals on or from the aforementioned optical disc 2, and widely applicable to a disc drive apparatus that records/reproduces information signals on or from an optical disc like a magneto-optical disc, or also applicable to the case where the optical disc is housed in a disc cartridge.

What is claimed is:

1. A disc drive apparatus comprising:
    a casing; and
    a disc drive unit contained in the casing,
    wherein the disc drive unit includes:
    a rotation drive mechanism which has a turntable for holding an optical disc and a spindle motor for rotatively driving the turntable, the spindle motor rotatively driving the optical disc and the turntable as a unit;
    an optical pick-up which radiates a light beam to a signal recording surface of the optical disc rotatively driven by the rotation drive mechanism to write/read signals on or from the optical disc;
    a guide mechanism which has at least one guide shaft for slidably supporting the optical pick-up to allow the same to move in the radial direction of the optical disc and guides the optical pick-up between the inner circumference and outer circumference of the optical disc, the at least one guide shaft having a distal end portion;
    a base which has an opening through which the turntable faces upward and another opening through which the optical pick-up faces upward, a main surface on the side of which the turntable and the optical pick-up face upward through the openings, and another main surface on the side opposite to the main surface to which the spindle motor and both end portions of the guide shaft are attached;

a support plate;

a spacer member; and an adjustment mechanism, wherein the spindle motor is attached to the base and between the support plate and the base with the spacer member disposed between the support plate and the base thereby assuring proper height of the turntable, wherein the spacer member has a guide slot extending to and between the base and the support plate and sized for receiving the distal end portion of the at least one guide shaft, and wherein the adjustment mechanism is associated with both the base and the support plate and contacts the distal end portion of the at least one guide shaft to move the distal end portion either toward or away from the base.

2. The disc drive apparatus according to claim 1, wherein the spacer member is made of a resin molding material.

3. The disc drive apparatus according to claim 1, wherein the spacer member has:

at least three first reference projections on a surface that faces the base for the purpose of achieving the uniformity in the height of the surface to be brought into contact with the base;

at least three second reference projections corresponding to the first reference projections, on a surface that faces a support plate for supporting the spindle motor for the purpose of achieving the uniformity in the height of the surface to be brought into contact with the support plate; and at least three through holes drilled across the positions that correspond to the positions of the first and second reference projections respectively, one of the base and the support plate has at least three screw holes drilled across the positions that correspond to the through holes of the spacer member, and the other has at least three hole portions drilled across the positions that correspond to the positions of the through holes of the spacer member, and the spindle motor is attached to the base through the spacer member by inserting screws into the screw holes, through holes and hole portions which are aligned with each other in a state.

4. The disc drive apparatus according to claim 1, wherein the guide mechanism has a pair of guide shafts disposed in parallel to the radial direction of the optical disc, the disc drive unit comprising the adjustment mechanism which movably supports both end portions of each of the pair of guide shafts in a direction perpendicular to the main surface of the base and adjusts the position at which the end portions of each of the guide shafts are supported to adjust the distance between the optical pick-up slidably supported by the pair of guide shafts and a signal recording surface of the optical disc held by the turntable, and skew of the optical pick-up relative to the signal recording surface of the optical disc.

5. A disc drive unit comprising:

a rotation drive mechanism which has a turntable for holding an optical disc and a spindle motor for rotatively driving the turntable, the spindle motor rotatively driving the optical disc and the turntable as a unit;

an optical pick-up which radiates a light beam to a signal recording surface of the optical disc rotatively driven by the rotation drive mechanism to write/read signals on or from the optical disc;

a guide mechanism which has at least one guide shaft for slidably supporting the optical pick-up to allow the same to move in the radial direction of the optical disc and guides the optical pick-up between the inner circumference and outer circumference of the optical disc, the at least one guide shaft having a distal end portion;

a base which has an opening through which the turntable faces upward and another opening through which the optical pickup faces upward, a main surface on the side of which the turntable and the optical pick-up face upward through the openings, and another main surface on the side opposite to the main surface to which the spindle motor and both end portions of the guide shaft are attached, wherein the spindle motor is attached to the base through a spacer member which performs positioning of the turntable in the vertical direction thereof with respect to the base;

a support plate;

a spacer member disposed between the support plate and the base thereby assuring proper height of the turntable; and an adjustment mechanism, wherein the spacer member has a guide slot extending to and between the base and the support plate and sized for receiving the distal end portion of the at least one guide shaft, and wherein the adjustment mechanism is associated with both the base and the support plate and contacts the distal end portion of the at least one guide shaft to move the distal end portion either toward or away from the base.

6. The disc drive unit according to claim 5, wherein the spacer member is made of a resin molding material.

7. The disc drive unit according to claim 5, wherein the spacer member has:

at least three first reference projections on a surface that faces the base for the purpose of achieving the substantial uniformity in the height of the surface to be brought into contact with the base;

at least three second reference projections corresponding to the first reference projections on a surface that faces a support plate for supporting the spindle motor for the purpose of achieving the substantial uniformity in the height of the surface to be brought into contact with the support plate; and at least three through holes drilled across the positions that correspond to the positions of the first and second reference projections, respectively, one of the base and the support plate has at least three screw holes drilled across the positions that correspond to the through holes of the spacer member, and the other has at least three hole portions drilled across the positions that correspond to the through holes of the spacer member, and the spindle motor is attached to the base through the spacer member by inserting screws into the screw holes, through holes and hole portions which are aligned with each other in a state.

8. The disc drive unit according to claim 5, wherein the guide mechanism has a pair of guide shafts disposed in parallel to the radial direction of the optical disc, the disc drive unit comprising an adjustment mechanism which movably supports both end portions of each of the pair of guide shafts in a direction perpendicular to the main surface of the base and adjusts the position at which the end portions of each of the guide shafts are supported to adjust the distance between the optical pick-up slidably supported by the pair of guide shafts and a signal recording surface of the optical disc held by the turntable, and skew of the optical pick-up relative to the signal recording surface of the optical disc.

* * * * *